UNITED STATES PATENT OFFICE.

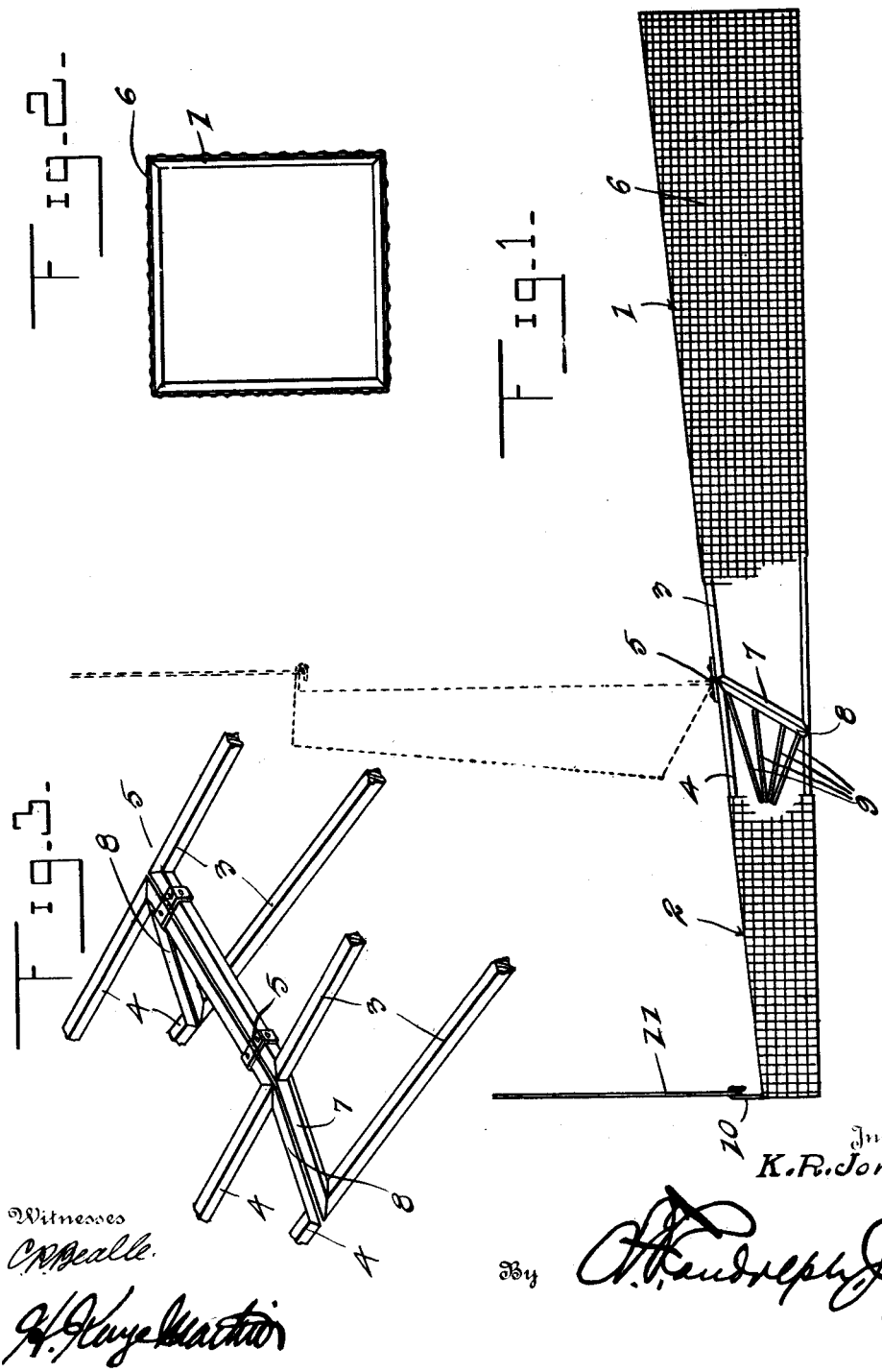

KEITH R. JONES, OF PLEASANTSHADE, VIRGINIA.

FISH-TRAP.

1,119,357.  Specification of Letters Patent.  Patented Dec. 1, 1914.

Application filed April 13, 1914. Serial No. 831,656.

*To all whom it may concern:*

Be it known that I, KEITH R. JONES, a citizen of the United States, residing at Pleasantshade, in the county of Greenesville and State of Virginia, have invented certain new and useful Improvements in Fish-Traps, of which the following is a specification.

This invention relates to new and useful improvements in fish traps, and has for its principal object to provide a trap in which it is possible to catch fish without injuring the same in any way.

Another object of the invention is to provide a simple and effective trap from which the fish may be removed without necessitating the users getting wet.

A further object of the invention is to provide a device which will be particularly simple and effective in use.

With these and other objects in view, the invention consists in the novel combination and arrangement of parts which will be fully set forth in the following specification and accompanying drawings, in which, Figure 1 is a side view in elevation of a fish trap constructed in accordance with this invention, showing a portion thereof broken away to more clearly illustrate the details of construction, Fig. 2 is an end view of the enlarged end of the trap, and Fig. 3 is a detail perspective view of a portion of the frame work to clearly show the details of the connection where the two sections join.

Referring now to the drawings by characters of reference, the numerals 1 and 2 designate as entireties the two coöperating sections which are formed of the rectangular tapering frameworks 3 and 4 respectively. The frame work 4 is hingedly secured as at 5 to the frame work 3 and is arranged to be drawn upwardly to assume the position illustrated by the dotted lines in Fig. 1. Each of the frames 3 and 4 is provided with a suitable wire mesh 6 which is arranged to form panels between the bars forming the frame to prevent the fish from escaping through the side walls of the device. The reduced end of the frame 3 is connected on its vertical side by the angle strips 7 which are arranged to coöperate with the angle strips 8 to form a bevel connection for the two members 1 and 2. Secured to the beveled end of the member 2 is provided the inwardly extending resilient arms 9 which converge toward their free ends and are arranged to form a closure for the enlarged end of the member 2, which will prevent fish, after having once entered the section 2, from returning and thereby escaping.

Secured to the reduced end of the section 2 is provided a suitable hook 10 which is arranged to secure the end of the flexible connection 11 to the section 2, and thereby provide a means whereby the sections may be drawn upwardly in the position illustrated in Fig. 1 by the dotted lines. From this position the user may gain access to the interior of the trap and remove the fish therefrom.

It will be apparent from the foregoing that in use the device is placed in the bottom of a stream or other waterway, and the fish will enter the enlarged end of the connection 1 and swim toward the reduced end thereof, thus approaching the resilient members 9 which are yieldably secured to the frame 4 so that very little pressure will open the members and permit the fish to pass therethrough. After the fish have entered the section 2, it will be apparent that any escape therefrom will be cut off since the resilient members 9 will spring back to their normal position and effectively close the opening through which the fish travel, and thereby prevent any escape from the trap. When the user of the trap desires to remove the fish, pull is exerted on the rope or flexible connection 11 and this through the medium of the hook 10 will raise the section 2 into the position illustrated by the dotted lines in Fig. 1 and easy access to the interior of the trap may be gained through the reduced end which is provided with a removable cover which will admit the hands of the user when removed and thereby it will be apparent that the fish caught in the section 2 may be removed. This cover is preferably formed of a rectangular frame which is arranged to fit the reduced end of the section 2, and this frame is covered with a suitable mesh similar to the mesh 6 hereinbefore referred to.

While in the foregoing there has been shown and described the preferred embodiment of this invention, it is to be understood that such changes may be made in the combination and arrangement of parts as will fall within the spirit and scope of the invention as defined in the appended claims.

Having thus described my invention, I claim:

1. In a device of the character described, a stationary tapering section, the reduced end of said section being beveled, a hinged section, the enlarged end of said hinged section being beveled and arranged to register with the beveled end of the stationary section, a plurality of yieldable converging arms secured in the hinged section at its enlarged end, said arms being arranged to swing outwardly to permit a fish to enter the section, and means at the free end of the hinged section to swing the same vertically to permit the user to remove the contents therefrom.

2. A fish trap including a pair of tapered sections, one of said sections being larger than the other, the larger section being stationary, means for securing the smaller section to the larger section, the abutting end of each section being of substantially the same size to insure alinement of the wall, the upper wall of the larger section being of less length than the lower wall to form a beveled end, the top wall of the smaller section being of greater length than the bottom wall to form a beveled end, these beveled ends being arranged to abut and so constructed as to enable the smaller section to swing upwardly without engaging the bottom of the body of water in which the device is used.

In testimony whereof I affix my signature in presence of two witnesses.

KEITH R. JONES.

Witnesses:
J. W. WEBB,
R. H. LEE.

Copies of this patent may be obtained for five cents each, by addressing the "Commissioner of Patents, Washington, D. C."